INVENTOR,
KURT IKRATH.

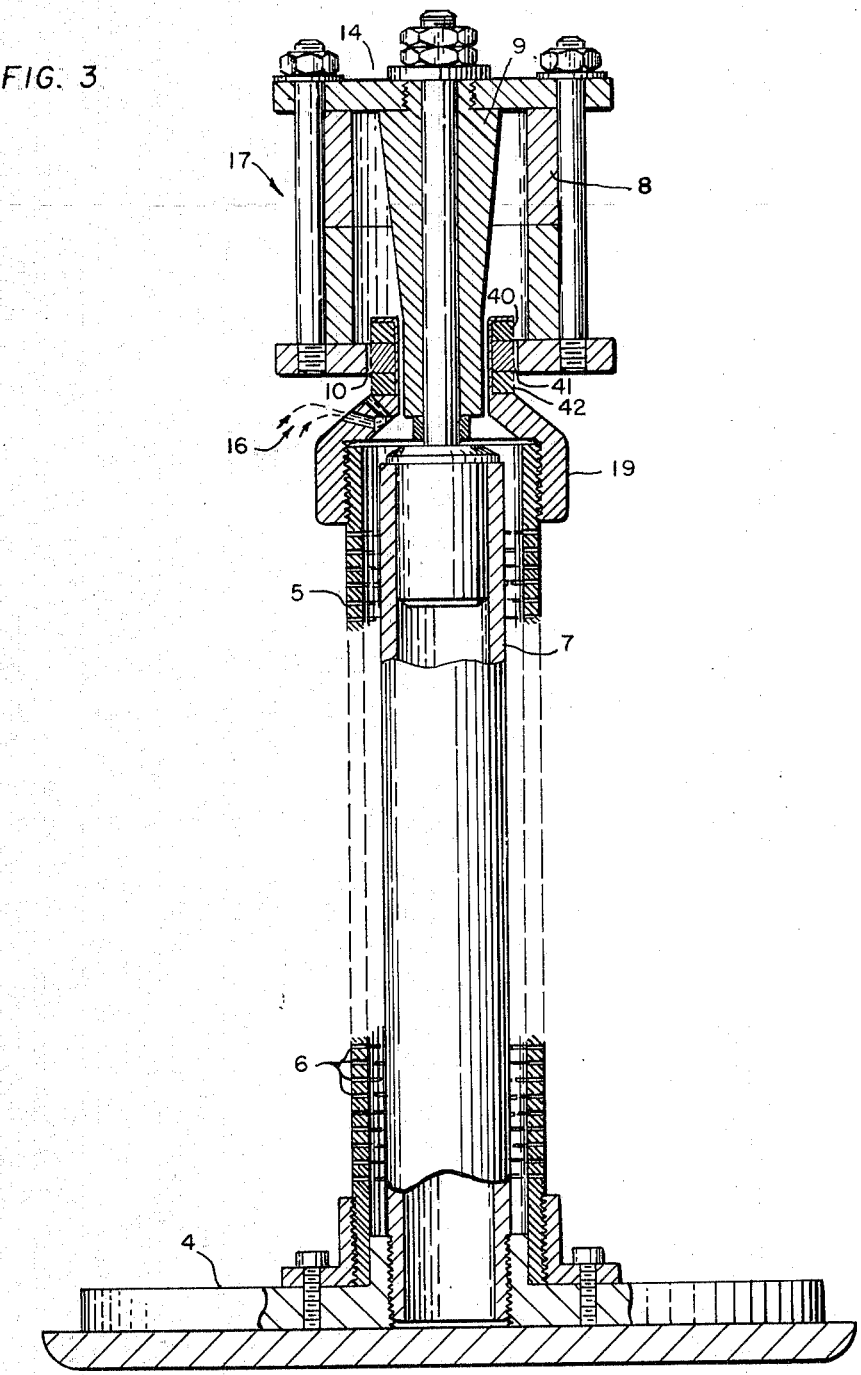

United States Patent Office 3,296,589
Patented Jan. 3, 1967

3,296,589
SEISMIC TRANSMISSION-RECEPTION SYSTEM
Kurt Ikrath, Elberon, N.J., assignor to the United States of America as represented by the Secretary of the Army
Filed Apr. 1, 1964, Ser. No. 357,023
2 Claims. (Cl. 340—17)

The invention described herein may be manufactured and used by or for the Government for governmental purposes without the payment of any royalty thereon.

The present invention relates to a seismic transmission-reception system and more particularly to such a system utilizing a tuned seismic transducer which may be alternately used as a transmitter or a receiver of seismic waves. Such a transducer is useful in a pulse type seismic system in which pulse modulated sinusoidal seismic signals are launched through the earth and echoes of said seismic signals from subsurface strata and other underground reflecting media are subsequently picked up at the launching site. The direction, amplitude and timing of the echo signal reveals the nature of the underground structure and such a system in a useful geophysical tool. The present invention comprises a novel seismic transmission-reception system of the aforementioned type which utilizes a tuned seismic transducer as both a transmitter and receiver of seismic waves. A tuned transducer is resonant to a narrow band of frequencies. Wide band transducers such as microphones, loudspeakers, and geophones all have resonant frequencies, however viscous or magnetic damping means are attached to the moving elements of such transducers to reduce the response at the resonant frequency and thus equalize the response over the operating bandwidth. The use of these damping means reduces the efficiency of such transducers since the damping means introduces frictional losses which dissipate power and limit the amplitude of vibration. The tuned transducer of the present invention, on the other hand, is intended to be driven only at its resonant frequency and therefore has no built-in damping means. The result is a large amplitude of vibrations at the resonant frequency and efficient operation. A disadvantage of this type of transducer in a pulse type seismic system such as described above is that the transducer will ring or vibrate for a time after the transmitted signal is removed therefrom. The system of the present invention includes means to rapidly brake these vibrations and thus prepare the transducer for the reception of the echo seismic wave. In another aspect of the invention, a tuned seismic transmitter is provided with three separate drive coils, each of which is designed to perform a different function in a pulse type seismic system.

It is, therefore, an object of this invention to provide a novel seismic transmission-reception system adapted for geophysical exploration.

It is a further object of this invention to provide a seismic transmission-reception system in which a single transducer serves alternately as a seismic transmitter and seismic receiver.

Another object of this invention is to provide a seismic transmission-reception system including a single tuned seismic transducer which serves alternately as a transmitter and receiver.

A still further object is to provide a means for rapidly braking the vibration of a resonant transducer after the driving signal is removed.

Another object of the invention is to provide a tuned seismic transducer with a plurality of driving coils each adapted for a different function.

These as well as other objects and advantages of the present invention will become apparent from the following detailed description and the drawings, in which:

FIG. 3 is a sectional view of a tuned seismic transducer which may be incorporated in the system of FIGS. 1 and 2.

Figure 1:
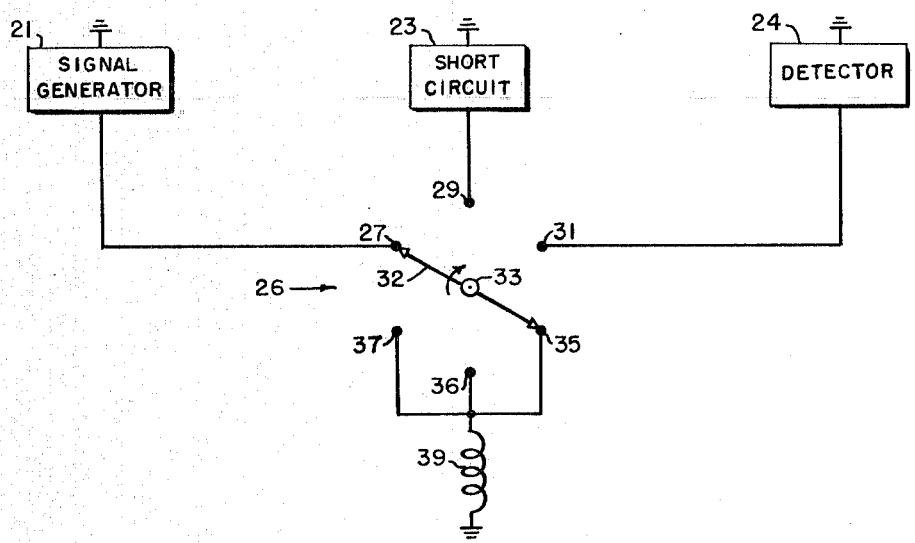
FIG. 1 is a schematic diagram of one embodiment of the seismic transmission-reception system of the present invention.

Referring first to FIG. 1 there is shown the drive coil 39 of a tuned seismic transducer such as that of FIG. 3. Electrical signals applied to the drive coil 39 will be converted into mechanical vibrations or waves which will in turn be coupled to the earth as seismic waves of corresponding frequency. Conversely, any seismic waves in the earth which reach the transducer will set it in motion and generate a signal in coil 39 corresponding to the received seismic wave. Thus the transducer will function as both a seismic transmitter and a seismic receiver. As shown in FIG. 1, the drive coil 39 of the transducer has one terminal connected to the three terminals 35, 36 and 37 of rotary switch 26 and the other terminal grounded. The signal generator 21 has its output connected between switch terminal 27 and ground. Short circuit 23 is connected between switch terminal 29 and ground and detector 24 between switch terminal 31 and ground. The rotor 32 of switch 26 rotates clockwise around the point 33 to sequentially connect terminals 27–35 (as illustrated), then terminals 29–36 and finally terminals 31–37, after which the cycle repeats. In the position illustrated the sinusoidal signal generator 21 is connected to coil 39 and energizes the transducer to launch a seismic wave therefrom. The frequency of sinusoidal signal generator 21 is made the same as the resonant frequency of the transducer. As explained above, such a resonant transducer includes no viscous or electromagnetic damping and hence when the signal generator 21 is disconnected from the drive coil 39 as the switch rotor moves off of the contact 27, the transducer will continue to ring or vibrate at its resonant frequency. In order to rapidly quench or brake this ringing, the drive coil 39 is connected to the short circuit 23. While ringing, the transducer motion generates a corresponding voltage in coil 39. This voltage is short-circuited by 23 to produce currents within the coil 39 which oppose or brake the motion which produced them. As the rotor 32 moves off of terminal 29 to 31 the tuned detector 24 is connected to coil 39. The detector is tuned to the frequency of the signal generator 21 and the transducer and detects any portion of the transmitted seismic energy which returns to the transducer, for example, reflections from subsurface strata. The time delay of the reflected wave indicates the distance or range of any reflecting medium. The use of the short circuit to brake the transducer after transmission makes the system more sensitive to short-range reflecting media, since the received seismic signal from such media would otherwise be masked by the ringing of the transducer.

Figure 2:
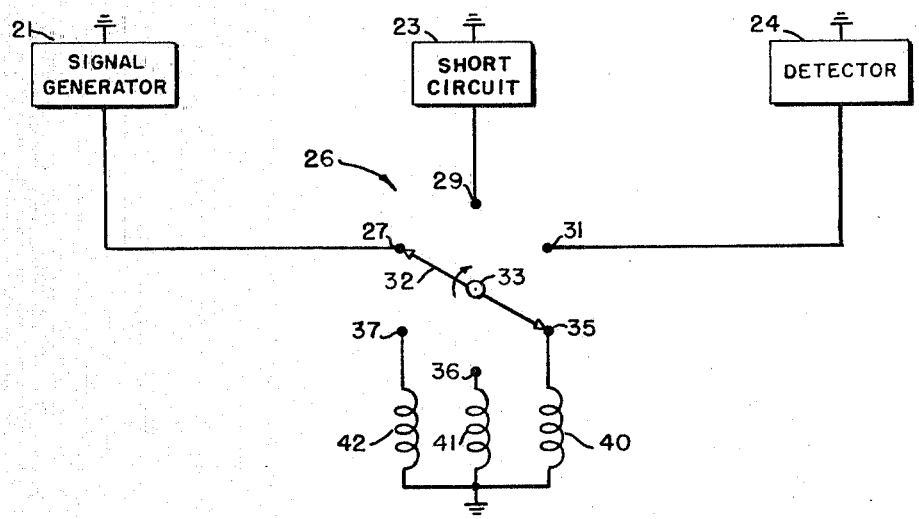
FIG. 2 is an alternate embodiment of said transmission-reception system.

FIG. 2 illustrates another embodiment of the system of FIG. 1 in which a three-coil seismic transducer is utilized. In FIG. 2 the elements the same as those of FIG. 1 have been given the same reference numerals and perform the same functions. In place of the single coil 39 of FIG. 1, the transducer of FIG. 2 includes three coils 40, 41 and 42 which are connected respectively to switch terminals 35, 36 and 37. As can be seen from the circuit diagram, the switch 26 sequentially connects the signal generator 21 to the coil 40, the short circuit 23 to the coil 41 and the detector 24 to the coil 42. Thus coil 40 is used solely for transmitting, coil 41 solely for braking and coil 42 solely for receiving or detecting. With this arrangement each of the individual transducer coils may be specifically designed for its intended purpose. For example, for maximum efficiency the receiving coil should have high impedance, for rapid braking the braking coil should have low impedance, and the transmitting coil impedance should be intermediate the other two. Typical impedance values for these coils may be 1500, .05 and 10 ohms, respectively. The system of FIG. 2 functions the same as that of FIG. 1 except for the use of the three coils.

FIG. 3 shows the structure of a tuned seismic transducer which may be used in the systems of FIG. 1 or 2. The transducer comprises an electrical driver unit 17 mounted atop a supporting rod 7. The electrical driver unit 17 is similar to the voice coil assembly of a loudspeaker and comprises a cylindrical magnetic circuit 8 with an end cap 14 and a central permanent magnet 9. This structure produces a radial magnetic field in the air gap 10 which crosses the turns of coils 40, 41, and 42 at right angles. Mounted on base 4 and coaxial with rod 7 is a hollow cylindrical sleeve 5 with a plurality of circumferential slots 6 therein. A cap 19 is threaded onto the top of slotted sleeve 5 and the coils 40, 41, and 42 of the transducer are wound in a groove in cap 19. As can be seen the coils are within the air gap 10. Also, since the magnetic circuit is supported by the rod 7 and the coils are rigidly attached to the top of slotted cylinder 5, any current through the coils will cause a vertical motion to be transmitted through the slotted sleeve 5, the base 4 and thence to the earth as a seismic wave. The slotted sleeve 5 is the equivalent of a stiff spring and acts as a mechanical impedance matcher or transformer for matching the impedance of the electrical driver 17 to the impedance of the earth. A perfect match will be obtained at only one frequency and harmonics thereof, therefore the device is frequency sensitive and for this reason has been termed a tuned or resonant seismic transducer. A seismic transducer of the type described designed for operation in the vicinity of 80 c.p.s. will stand about 15 inches in height and weigh about 40 pounds. When used in the single-coil embodiment of FIGURE 1, the coil 39 would be wound in the space occupied by the three coils 40, 41, and 42.

While a rotary electro-mechanical type switch has been illustrated in FIGS. 1 and 2, other types of switches may be used in place thereof, for example, electronic switches.

While the invention has been described in connection with preferred embodiments, many modifications thereof will occur to those skilled in the art without departing from the inventive concepts disclosed herein, accordingly the invention should be limited only by the scope of the appended claims.

What is claimed is:

1. A seismic transmission-reception system comprising, an undamped tuned seismic transducer, said transducer comprising three drive coils attached to the top of a vertically disposed slotted cylindrical sleeve, said sleeve being attached at its lower end to a flat base which rests on the earth and means to produce a direct magnetic field which crosses the turns of said coils at right angles; switch means for sequentially and repeatedly connecting a different one of said three drive coils to a sinusoidal signal generator, to a short circuit and to tuned detector in the order named.

2. A seismic transmission-reception system comprising, an undamped tuned seismic transducer having first, second and third coils, said first coil having a given impedance, said second coil having an impedance lower than said given impedance, said third coil having an impedance higher than said given impedance, switch means for sequentially and repeatedly connecting a sinusoidal signal generator to said first coil, a short circuit to said second coil, and a tuned detector to said third coil in the order named, said sinusoidal signal generator, said tuned detector and said tuned seismic transducer all being tuned to the same frequency.

References Cited by the Examiner

UNITED STATES PATENTS

| 2,424,724 | 7/1947 | Tolk | 340—17 |
| 3,088,541 | 5/1963 | Alexander et al. | 181—.5 |
| 3,210,725 | 10/1965 | Andreasen | 340—17 |
| 3,213,458 | 10/1965 | Hansel et al. | 333—7 X |

BENJAMIN A. BORCHELT, Primary Examiner.

SAMUEL FEINBERG, Examiner.

P. A. SHANLEY, Assistant Examiner.